United States Patent
Zhan et al.

(10) Patent No.: US 11,721,241 B2
(45) Date of Patent: Aug. 8, 2023

(54) BIONIC DIGESTIVE TRACT AS WELL AS PREPARATION METHOD AND APPLICATION THEREOF

(71) Applicant: Jiangnan University, Wuxi (CN)

(72) Inventors: Xiaobei Zhan, Wuxi (CN); Zhitao Li, Wuxi (CN); Minjie Gao, Wuxi (CN); Li Zhu, Wuxi (CN); Wenlong Zhang, Wuxi (CN); Jingjing Xu, Wuxi (CN); Yun Jiang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 490 days.

(21) Appl. No.: 16/875,106

(22) Filed: May 15, 2020

(65) Prior Publication Data
US 2020/0279509 A1    Sep. 3, 2020

Related U.S. Application Data

(63) Continuation of application No. PCT/CN2018/117135, filed on Nov. 23, 2018.

(30) Foreign Application Priority Data

Sep. 29, 2018 (CN) .......................... 201811143735.4
Sep. 29, 2018 (CN) .......................... 201811143745.8
(Continued)

(51) Int. Cl.
*G09B 23/30* (2006.01)
*B29B 13/00* (2006.01)
(Continued)

(52) U.S. Cl.
CPC .............. *G09B 23/30* (2013.01); *B29B 13/00* (2013.01); *B29C 41/02* (2013.01);
(Continued)

(58) Field of Classification Search
None
See application file for complete search history.

(56) References Cited

U.S. PATENT DOCUMENTS 8,463,288 B2     6/2013 Hyde et al.
2016/0027344 A1*  1/2016 Felsinger ............... G09B 23/30
                                                          264/308

FOREIGN PATENT DOCUMENTS

CN     103706124 A      4/2014
CN     103740589 A      4/2014
(Continued)

OTHER PUBLICATIONS

PCT/CN2018/117135 ISR ISA210 dated May 15, 2019.
(Continued)

*Primary Examiner* — Robert J Grun
(74) *Attorney, Agent, or Firm* — IPro, PLLC; Na Xu

(57) ABSTRACT

The disclosure discloses a bionic digestive tract as well as a preparation method and application thereof, belonging to the field of bionic technologies and the field of biological technologies. The bionic digestive tract of the disclosure is prepared by mixing a base material (one or more of silica gel, latex and hydrogel) and auxiliary materials (silicone oil and a curing agent) in a certain mass ratio (the mass ratio of the base material to the silicone oil to the curing agent is 100:(0.5 to 10):(0.5 to 3.5)). The simulation performance of the bionic digestive tract is excellent, has strong consistency with a true human digestive tract in terms of performance, structure and function, can simulate the true states of food, drugs and microorganisms in a digestive system, and has great application prospects in the research process of food and drugs.

1 Claim, 3 Drawing Sheets

(30) Foreign Application Priority Data

Sep. 29, 2018 (CN) .......................... 201811143746.2
Sep. 29, 2018 (CN) .......................... 201811143747.7
Sep. 29, 2018 (CN) .......................... 201811143752.8

(51) Int. Cl.
*B29C 41/02* (2006.01)
*B29K 83/00* (2006.01)
*B29K 105/00* (2006.01)
*B29L 31/00* (2006.01)

(52) U.S. Cl.
CPC ... *B29B 2013/005* (2013.01); *B29K 2083/005* (2013.01); *B29K 2105/0061* (2013.01); *B29L 2031/7532* (2013.01)

(56) References Cited

FOREIGN PATENT DOCUMENTS

CN  104464476 A  3/2015
WO  WO-2015148817 A1 * 10/2015  ............. B29B 7/002

OTHER PUBLICATIONS

Chen, Li-Ding et. al. Practicability Study of the Functional Silicone Materials Used for Building the in vitro Rat Stomach, Journal of Sanming University, Dec. 2016,vol. 33 No. 6.

* cited by examiner

BIONIC DIGESTIVE TRACT AS WELL AS PREPARATION METHOD AND APPLICATION THEREOF

TECHNICAL FIELD

The disclosure relates to a bionic digestive tract as well as a preparation method and application thereof, belonging to the field of bionic technologies and the field of biological technologies.

BACKGROUND

In the research process of food and drugs, it is very important to objectively and accurately evaluate the digestion process of food and drugs in a human body on determining food components, drug components and their roles in the digestive tract of the human body.

A human digestive tract in-vitro simulation device (such as SHINE, IViDiS, TIM, DGM and HGS) is a bionic simulation device for a human digestive system and its digestive environment and dynamic behaviors of fluid in the digestive tract. It can simulate the digestion process of different samples in the in-vitro model and the impact of these samples on intestinal microorganisms, so as to provide a lot of valuable data for research and development of new functional food, if it is used as a "pre-test" to predict a live test and completely or partially replace the live test, the purposes of reducing cost and time, improving repeatability and accuracy can be achieved, and there is no theoretical limit.

Thus, the human digestive tract in-vitro simulation device is becoming more and more crucial in the research of food, drugs and even microorganisms, provides great convenience for the research of food science and human nutrition, and is incomparable to mouse experiments or human volunteer experiments.

As the simulated digestive tract (mainly including stomach, small intestine and large intestine) is used as a main body of a human digestive tract in-vitro simulation device, the simulation degree of the simulated digestive tract on the true digestive tract is very important in the simulation performance of the whole human digestive tract in-vitro simulation device.

At present, people usually use materials such as silica gel and latex to make a simulated digestive tract model, which can well reproduce the digestive environments in the digestive tract, such as no viscosity, water insolubility, no reaction with acid and alkali and high and low temperature resistance.

However, the internal physiological structures of the existing digestive tract models made of silica gel and latex are all smooth and have no food-grinding function. They can only truly simulate the digestion state of some liquid foods (drinks, milk and the like) that do not need to be ground in the stomach. For solid (rice, fruit, meat and the like) or semi-solid (porridge, soup, etc.) food, they can only reflect the food mixing function, and cannot truly reflect the function of the gastrointestinal tract to grind and digest food.

In addition, these digestive tract models are often simply made as a whole structure, for example, the whole stomach is made of silica gel or latex at one time. These whole stomachs cannot simulate the "back flow" function between the stomach antrum and the stomach body, so as to result in inaccurate testing results of experiments.

Meanwhile, these digestive tract models made of silica gel and latex are not satisfactory in terms of simulation performances, such as hardness, expansion rate and elasticity. There is still a certain gap between the digestive tract models and the true human digestive tract.

Thus, there is an urgent need for innovation and upgrading of the bionic digestive tract to improve its simulation performance, improve its digestive environments (no viscosity, water insolubility, no reaction with acid and alkali, and high and low temperature resistance) of the stimulated true human digestive tract and the authenticity of the functions of various parts of the digestive tract.

SUMMARY

In order to solve the above problems, the disclosure provides a bionic digestive tract as well as a preparation method and application thereof. The bionic digestive tract is prepared by mixing a base material (one or more of silica gel, latex and hydrogel) and auxiliary materials (silicone oil and a curing agent) in a certain mass ratio (the mass ratio of the base material to the silicone oil to the curing agent is 100:(0.5 to 10):(0.5 to 3.5)). The bionic digestive tract is excellent in bionic performance, has extremely high consistency with a true human digestive tract in terms of performances, structures and functions, can stimulate the true states of food, drugs, microorganisms and the like in a digestive system, and has significant prospects in the research process of food and drugs.

The technical solution of the disclosure is as follows:

The disclosure provides a bionic material, components of the bionic material comprising a base material and auxiliary materials, wherein the base material comprises one or more of silica gel, latex or hydrogel; and the auxiliary materials comprise silicone oil and a curing agent.

In one embodiment of the disclosure, the mass ratio of the base material to the silicone oil to the curing agent is 100:(0.5 to 10):(0.5 to 3.5).

In one embodiment of the disclosure, the base material is silica gel.

In one embodiment of the disclosure, the silica gel is transparent silica gel or semi-transparent silica gel.

In one embodiment of the disclosure, the curing agent comprises one or more of tetraethoxysilane, vinyl triamine, DETA aminoethyl piperazine (AE), m-phenylenediamine (m-PDA, MPD), diaminodiphenyl-methane (DDM) and HT-972 DEH-50.

The disclosure provides a bionic digestive tract which is prepared by using the bionic material according to any one of claims 1 to 3; the digestive tract comprises one or more of a stomach, a large intestine, an ileum, a duodenum and a jejunum.

In one embodiment of the disclosure, when the digestive tract is the stomach, the mass ratio of the base material to the silicone oil to the curing agent is 100:(5 to 10):(1 to 3); or when the digestive tract is the large intestine, the mass ratio of the base material to the silicone oil to the curing agent is 100:(3 to 6):(1 to 3); or when the digestive tract is the ileum, the mass ratio of the base material to the silicone oil to the curing agent is 100:(2.5 to 3.5):(0.5 to 1.5); or when the digestive tract is the duodenum, the mass ratio of the base material to the silicone oil to the curing agent is 100:(0.5 to 1.5):(2.5 to 3.5); or when the digestive tract is the jejunum, the mass ratio of the base material to the silicone oil to the curing agent is 100:(1.5 to 2.5):(1.5 to 2.5).

In one embodiment of the disclosure, the base material is silica gel.

In one embodiment of the disclosure, the silica gel is transparent silica gel or semi-transparent silica gel.

In one embodiment of the disclosure, the curing agent comprises one or more of tetraethoxysilane, vinyl triamine, DETA aminoethyl piperazine (AE), m-phenylenediamine (m-PDA, MPD), diaminodiphenyl-methane (DDM) and HT-972 DEH-50.

The disclosure provides a preparation method of a bionic stomach, the method comprises the steps: firstly preparing a stomach fundus, stomach body and stomach antrum moulds having interior physiological structures of a true stomach fundus, stomach body and stomach antrum, then smearing a bionic stomach raw material on surfaces of the stomach fundus, stomach body and stomach antrum moulds according to a certain thickness, standing so as to solidify and mold the bionic stomach raw material, and removing the moulds so as to obtain the bionic stomach, wherein preparation of the stomach fundus, stomach body and stomach antrum moulds having the interior physiological structures of the true stomach fundus, stomach body and stomach antrum comprises the steps: respectively filling a stomach fundus, a stomach body and a stomach antrum in a precise human stomach anatomical model of a medicine gastroenterology department with a plastic material, then taking out the precise human stomach anatomical model of the medicine gastroenterology department, and solidifying and molding the plastic material to obtain the stomach fundus, stomach body and stomach antrum moulds having the interior physiological structures of the true stomach fundus, stomach body and stomach antrum; the bionic stomach material is obtained by mixing the base material and the auxiliary materials that are used for preparing the bionic stomach in a certain mass ratio and then putting the mixture into a vacuum machine for vacuumizing and removing bubbles; the base material comprises one or more of silica gel, latex or hydrogel; and the auxiliary materials comprise silicone oil and a curing agent.

In one embodiment of the disclosure, the plastic material comprises argil, paraffin, glass or steel.

In one embodiment of the disclosure, the argil is soft clay.

In one embodiment of the disclosure, preparation of stomach fundus, stomach body and stomach antrum moulds having the interior physiological structures of the true stomach fundus, stomach body and stomach antrum comprises the steps: respectively filling a stomach fundus, a stomach body and a stomach antrum in a precise human stomach anatomical model of a medicine gastroenterology department with soft clay, then taking out the precise human stomach anatomical model of the medicine gastroenterology department, baking the soft clay so as to solidify and mold, and naturally cooling the soft clay to prevent generation of cracks due to quick cooling of the mould, thereby obtaining the stomach fundus, stomach body and stomach antrum moulds having the interior physiological structures of the true stomach fundus, stomach body and stomach antrum.

In one embodiment of the disclosure, the precise human stomach anatomical model of the medicine gastroenterology department is a hollow model, wherein the ratio of the hollow model to a true stomach is 1:1.

In one embodiment of the disclosure, the baking time is 15 to 30 min.

In one embodiment of the disclosure, the mass ratio of the base material to the silicone oil to the curing agent is 100:(5 to 10):(1 to 3).

In one embodiment of the disclosure, the mass ratio of the base material to the silicone oil to the curing agent is 100:8:2.

In one embodiment of the disclosure, the base material is silica gel.

In one embodiment of the disclosure, the silica gel is transparent silica gel or semi-transparent silica gel.

In one embodiment of the disclosure, the curing agent comprises one or more of tetraethoxysilane, vinyl triamine, DETA aminoethyl piperazine (AE), m-phenylenediamine (m-PDA, MPD), diaminodiphenyl-methane (DDM) and HT-972 DEH-50.

In one embodiment of the disclosure, the conditions of vacuumizing and removing bubbles are as follows: the negative pressure of the vacuum machine is −0.1 to 0.09 MPa, and time is 5 to 10 min.

In one embodiment of the disclosure, the conditions of vacuumizing and removing bubbles are as follows: the negative pressure of the vacuum machine is 0.09 MPa, and time is 7 min.

In one embodiment of the disclosure, the thickness of the bionic stomach raw material smeared on the surfaces of the stomach fundus, stomach body and stomach antrum moulds is 1 to 3 mm.

In one embodiment of the disclosure, the thickness of the bionic stomach raw material smeared on the surfaces of the stomach fundus, stomach body and stomach antrum moulds is 2 mm.

In one embodiment of the disclosure, the standing time is 2 to 4 h.

In one embodiment of the disclosure, the standing time is 3 h.

The disclosure also provides a bionic stomach prepared by using the above method.

The disclosure also provides a preparation method of a bionic large intestine, the method comprises the steps: first preparing a large intestine mould having an interior physiological structure of a true large intestine, then smearing a bionic large intestine raw material on a surface of the large intestine mould according to a certain thickness, standing so as to solidify and mold the bionic large intestine raw material, and removing the mould so as to obtain the bionic large intestine, wherein preparation of the large intestine mould having the interior physiological structure of the true large intestine comprises the steps: filling a large intestine of a precise human intestinal tract anatomical model of a medicine gastroenterology department with a plastic material, then taking out the large intestine of the precise human intestinal tract anatomical model of the medicine gastroenterology department, and solidifying and molding the plastic material to obtain the large intestine mould having the interior physiological structure of the true large intestine; the bionic large intestine material is obtained by mixing a base material and auxiliary materials that are used for preparing the bionic large intestine in a certain mass ratio and then putting the mixture into a vacuum machine for vacuumizing and removing bubbles; the base material comprises one or more of silica gel, latex and hydrogel; the auxiliary materials comprise silicone oil and a curing agent.

In one embodiment of the disclosure, the plastic material comprises argil, paraffin, glass or steel.

In one embodiment of the disclosure, the argil is soft clay.

In one embodiment of the disclosure, preparation of a large intestine mould having the interior physiological structure of the true large intestine comprises the steps: filling a large intestine of a precise human intestinal tract anatomical model of a medicine gastroenterology department with soft clay, then taking out the large intestine of the precise human intestinal tract anatomical model of the medicine gastroenterology department, baking the soft clay so as to solidify and mold, and naturally cooling the soft clay to prevent generation of cracks due to quick cooling of the mould, thereby obtaining the large intestine mould having the interior physiological structure of the true large intestine.

In one embodiment of the disclosure, the precise human intestinal tract anatomical model of the medicine gastroenterology department is a hollow model, wherein the ratio of the hollow model to the true intestinal tract is 1:1.

In one embodiment of the disclosure, the large intestine mould is 4 to 5 cm in diameter and 20 to 30 cm in length.

In one embodiment of the disclosure, the baking time is 15 to 30 min.

In one embodiment of the disclosure, the mass ratio of the base material to the silicone oil to the curing agent is 100:(3 to 6):(1 to 3).

In one embodiment of the disclosure, the mass ratio of the base material to the silicone oil to the curing agent is 100:4:2.

In one embodiment of the disclosure, the base material is silica gel.

In one embodiment of the disclosure, the silica gel is transparent silica gel or semi-transparent silica gel.

In one embodiment of the disclosure, the curing agent comprises one or more of tetraethoxysilane, vinyl triamine, DETA aminoethyl piperazine (AE), m-phenylenediamine (m-PDA, MPD), diaminodiphenyl-methane (DDM) and HT-972 DEH-50.

In one embodiment of the disclosure, the conditions of vacuumizing and removing bubbles are as follows: the negative pressure of the vacuum machine is −0.1 to 0.09 MPa, and time is 5 to 10 min.

In one embodiment of the disclosure, the conditions of vacuumizing and removing bubbles are as follows: the negative pressure of the vacuum machine is 0.09 MPa, and time is 7 min.

In one embodiment of the disclosure, the thickness of the bionic large intestine raw material smeared on the surface of the large intestine mould is 1 to 3 mm.

In one embodiment of the disclosure, the thickness of the bionic large intestine raw material smeared on the surface of the large intestine mould is 2 mm.

In one embodiment of the disclosure, the standing time is 2 to 4 h.

In one embodiment of the disclosure, the standing time is 3 h.

The disclosure provides a bionic large intestine prepared by using the above method.

The disclosure provides a preparation method of a bionic ileum, the method comprises the steps: firstly preparing an ileum mould having an interior physiological structure of a true ileum and retaining needles, then smearing a bionic ileum raw material on a surface of the ileum mould contacting with a human ileum anatomical model according to a certain thickness, standing so as to solidify and mold the bionic ileum raw material, pulling out the needles, and removing the mould so as to obtain the bionic ileum having intestinal villi and being hollow, wherein preparation of the ileum mould having the interior physiological structure of the true ileum and retaining the needles comprises the steps: filling the precise human ileum anatomical model of a medicine gastroenterology department with a plastic material, then taking out the human ileum anatomical model, poking each depression of the plastic material corresponding to intestinal villi on the human ileum anatomical model by the needle to form holes, finally, continuing to retain the needles on the plastic material, and solidifying and molding the plastic material to obtain the ileum mould having the interior physiological structure of the true ileum and retaining the needles; the bionic ileum material is obtained by mixing a base material and auxiliary materials that are used for preparing the bionic ileum in a certain mass ratio and then putting the mixture into a vacuum machine for vacuumizing and removing bubbles;

or the method comprises the steps: firstly preparing an ileum mould having an interior physiological structure of a true ileum and retaining needles, then smearing a bionic ileum raw material on a surface of the ileum mould contacting with a human ileum anatomical model according to a certain thickness, standing so as to solidify and mold the bionic ileum raw material, pulling out the needles but skipping removing the mould so as to obtain the bionic ileum having intestinal villi and being hollow, then covering a surface of the bionic ileum not contacting with the ileum mould with one layer of partition, smearing the bionic ileum raw material on the surface of the partition not contacting with the bionic ileum according to a certain thickness, standing so as to solidify and mold the bionic ileum raw material smeared on the surface of the partition, removing the partition, and removing the mould to obtain the bionic ileum having ileum physiological structure villi and capable of secreting intestinal juice, wherein preparation of the ileum mould having the interior physiological structure of the true ileum and retaining the needles comprises the steps: filling the precise human ileum anatomical model of a medicine gastroenterology department with a plastic material, then taking out the human ileum anatomical model, poking each depression of the plastic material corresponding to intestinal villi on the human ileum anatomical model by the needle to form holes, finally, continuing to retain the needles on the plastic material, and solidifying and molding the plastic material to obtain the ileum mould having the interior physiological structure of the true ileum and retaining the needles; the bionic ileum material is obtained by mixing a base material and auxiliary materials that are used for preparing the bionic ileum in a certain mass ratio and then putting the mixture into a vacuum machine for vacuumizing and removing bubbles;

the base material comprises one or more of silica gel, latex and hydrogel; the auxiliary materials comprise silicone oil and/or a curing agent.

In one embodiment of the disclosure, the human intestinal tract anatomical model of the medicine gastroenterology department is a hollow model, wherein the ratio of the hollow model to a true ileum is 1:1.

In one embodiment of the disclosure, the plastic material comprises argil, paraffin, glass or steel.

In one embodiment of the disclosure, the plastic material comprises argil, paraffin, glass or steel.

In one embodiment of the disclosure, the argil is soft clay.

In one embodiment of the disclosure, preparation of an ileum mould having the interior physiological structure of the true ileum and retaining needles comprises the steps: respectively filling the precise human ileum anatomical model of the medicine gastroenterology department with the soft clay, then taking out the human ileum anatomical model, poking each depression of the soft clay corresponding to intestinal villi on the human ileum anatomical model by the needle to form holes, finally continuing to retain the needles on the soft clay, baking the soft clay so as to solidify and mold, and naturally cooling the soft clay to prevent generation of cracks due to quick cooling of the mould, thereby obtaining the ileum mould having the interior physiological structure of the true ileum and retaining needles.

In one embodiment of the disclosure, the baking time is 15 to 30 min.

In one embodiment of the disclosure, the diameter of the hole is 0.2 to 1 mm.

In one embodiment of the disclosure, when each depression of the soft clay corresponding to intestinal villi on the human ileum anatomical model is poked by the needle to form holes, the needles should penetrate through the soft clay and one end of the needle exceeds the surface of the soft clay contacting with the human ileum anatomical model by at least 2 mm.

In one embodiment of the disclosure, the ileum mould is 1.5 to 2.5 cm in diameter and 20 to 30 cm in length.

In one embodiment of the disclosure, the mass ratio of the base material to the silicone oil to the curing agent is 100:(2.5 to 3.5):(0.5 to 1.5).

In one embodiment of the disclosure, the mass ratio of the base material to the auxiliary material is 100:3:1.

In one embodiment of the disclosure, the base material is silica gel.

In one embodiment of the disclosure, the silica gel is transparent silica gel or semi-transparent silica gel.

In one embodiment of the disclosure, the curing agent comprises one or more of tetraethoxysilane, vinyl triamine, DETA aminoethyl piperazine (AE), m-phenylenediamine (m-PDA, MPD), diaminodiphenyl-methane (DDM) and HT-972 DEH-50.

In one embodiment of the disclosure, the conditions of vacuumizing and removing bubbles are as follows: the negative pressure of the vacuum machine is −0.1 to 0.09 MPa, and time is 5 to 10 min.

In one embodiment of the disclosure, the conditions of vacuumizing and removing bubbles are as follows: the negative pressure of the vacuum machine is 0.09 MPa, and time is 7 min.

In one embodiment of the disclosure, the thickness of the bionic ileum raw material smeared on the surface of the ileum mould is 2 to 3 mm.

In one embodiment of the disclosure, the thickness of the bionic ileum raw material smeared on the surface of the ileum mould is 2.5 mm.

In one embodiment of the disclosure, the standing time is 2 to 4 h.

In one embodiment of the disclosure, the standing time is 3 h.

In one embodiment of the disclosure, the partition comprises oily paper or a preservative film.

In one embodiment of the disclosure, the thickness of the bionic ileum raw material smeared on the surface of the partition is 2 to 3 mm.

In one embodiment of the disclosure, the thickness of the bionic ileum raw material smeared on the surface of the partition is 2.5 mm.

The disclosure provides a bionic ileum prepared by using the above method.

The disclosure provides a preparation method of bionic duodenum, the method comprises the steps: firstly preparing a duodenum mould having an interior physiological structure of a true duodenum and retaining needles, then smearing a bionic duodenum raw material on a surface of the duodenum mould contacting with a human duodenum anatomical model according to a certain thickness, standing so as to solidify and mold the bionic duodenum raw material, pulling out the needles, and removing the mould so as to obtain the bionic duodenum having intestinal villi and being hollow, wherein preparation of the duodenum mould having the interior physiological structure of the true duodenum and retaining the needles comprises the steps: filling the precise human duodenum anatomical model of a medicine gastroenterology department with a plastic material, then taking out the human duodenum anatomical model, poking each depression of the plastic material corresponding to intestinal villi on the human duodenum anatomical model by the needle to form holes, finally, continuing to retain the needles on the plastic material, and solidifying and molding the plastic material to obtain the duodenum mould having the interior physiological structure of the true duodenum and retaining the needles; the bionic duodenum material is obtained by mixing a base material and auxiliary materials that are used for preparing the bionic duodenum in a certain mass ratio and then putting the mixture into a vacuum machine for vacuumizing and removing bubbles;

or the method comprises the steps: firstly preparing a duodenum mould having an interior physiological structure of a true duodenum and retaining needles, then smearing a bionic duodenum raw material on a surface of the duodenum mould contacting with a human duodenum anatomical model according to a certain thickness, standing so as to solidify and mold the bionic duodenum raw material, pulling out the needles but skipping removing the mould so as to obtain the bionic duodenum having intestinal villi and being hollow, then covering a surface of the bionic duodenum not contacting with the duodenum mould with one layer of partition, smearing the bionic duodenum raw material on a surface of the partition not contacting with the bionic duodenum according to a certain thickness, standing so as to solidify and mold the bionic duodenum raw material smeared on the surface of the partition, removing the partition, and removing the mould to obtain the bionic duodenum having duodenum physiological structure villi and capable of secreting intestinal juice, wherein preparation of the duodenum mould having the interior physiological structure of the true duodenum and retaining the needles comprises the steps: filling the precise human duodenum anatomical model of a medicine gastroenterology department with a plastic material, then taking out the human duodenum anatomical model, poking each depression of the plastic material corresponding to intestinal villi on the human duodenum anatomical model by the needle to form holes, finally, continuing to retain the needles on the plastic material, and solidifying and molding the plastic material to obtain the duodenum mould having the interior physiological structure of the true duodenum and retaining the needles; the bionic duodenum material is obtained by mixing the base material and the auxiliary materials that are used for preparing the bionic duodenum in a certain mass ratio and then putting the mixture into a vacuum machine for vacuumizing and removing bubbles;

the base material comprises one or more of silica gel, latex or hydrogel; and the auxiliary materials comprise silicone oil and/or a curing agent.

In one embodiment of the disclosure, the human intestinal tract anatomical model of the medicine gastroenterology department is a hollow model, wherein the ratio of the hollow model to a true intestinal tract is 1:1.

In one embodiment of the disclosure, the plastic material comprises argil, paraffin, glass or steel.

In one embodiment of the disclosure, the plastic material comprises argil, paraffin, glass or steel.

In one embodiment of the disclosure, the argil is soft clay.

In one embodiment of the disclosure, preparation of a duodenum mould having the interior physiological structure of the true duodenum and retaining needles comprises the steps: filling the precise human uodenum model of the medicine gastroenterology department with soft clay, then taking out the precise human duodenum anatomical model, poking each depression of the soft clay corresponding to intestinal villi on the human duodenum anatomical model by the needle to form holes, finally continuing to retain the needles on the soft clay, baking the soft clay so as to solidify and mold, and naturally cooling the soft clay to prevent generation of cracks due to quick cooling of the mould, thereby obtaining the duodenum mould having the interior physiological structure of the true duodenum and retaining the needles.

In one embodiment of the disclosure, the baking time is 15 to 30 min.

In one embodiment of the disclosure, the diameter of the hole is 0.2 to 1 mm.

In one embodiment of the disclosure, when each depression of the soft clay corresponding to intestinal villi on the human duodenum anatomical model is poked by the needle to form holes, the needles should penetrate through the soft clay and one end of the needle exceeds the surface of the soft clay contacting with the human duodenum anatomical model by at least 2 mm.

In one embodiment of the disclosure, the duodenum mould is 3 to 4 cm in diameter and 20 to 30 cm in length.

In one embodiment of the disclosure, the mass ratio of the base material to the silicone oil to the curing agent is 100:(0.5 to 1.5):(2.5 to 3.5).

In one embodiment of the disclosure, the mass ratio of the base material to the auxiliary material is 100:1:3.

In one embodiment of the disclosure, the base material is silica gel.

In one embodiment of the disclosure, the silica gel is transparent silica gel or semi-transparent silica gel.

In one embodiment of the disclosure, the curing agent comprises one or more of tetraethoxysilane, vinyl triamine, DETA aminoethyl piperazine (AE), m-phenylenediamine (m-PDA, MPD), diaminodiphenyl-methane (DDM) and HT-972 DEH-50.

In one embodiment of the disclosure, the conditions of vacuumizing and removing bubbles are as follows: the negative pressure of the vacuum machine is −0.1 to 0.09 MPa, and time is 5 to 10 min.

In one embodiment of the disclosure, the conditions of vacuumizing and removing bubbles are as follows: the negative pressure of the vacuum machine is 0.09 MPa, and time is 7 min.

In one embodiment of the disclosure, the thickness of the bionic duodenum raw material smeared on the surface of the duodenum mould is 1 to 2 mm.

In one embodiment of the disclosure, the thickness of the bionic duodenum raw material smeared on the surface of the duodenum mould is 1.5 mm.

In one embodiment of the disclosure, the standing time is 2 to 4 h.

In one embodiment of the disclosure, the standing time is 3 h.

In one embodiment of the disclosure, the partition comprises oily paper or a preservative film.

In one embodiment of the disclosure, the thickness of the bionic duodenum raw material smeared on the surface of the partition is 1 to 5 mm.

In one embodiment of the disclosure, the thickness of the bionic duodenum raw material smeared on the surface of the partition is 1.5 mm.

The disclosure provides a bionic duodenum prepared by using the above method.

The disclosure provides a preparation method of a bionic jejunum, the method comprises the steps: firstly preparing a jejunum mould having an interior physiological structure of a true jejunum and retaining needles, then smearing a bionic jejunum raw material on a surface of the jejunum mould contacting with a human jejunum anatomical model according to a certain thickness, standing so as to solidify and mold the bionic jejunum raw material, pulling out the needles, and removing the mould so as to obtain the bionic jejunum having intestinal villi and being hollow, wherein preparation of the jejunum mould having the interior physiological structure of the true jejunum and retaining the needles comprises the steps: filling the precise human jejunum anatomical model of a medicine gastroenterology department with a plastic material, then taking out the human jejunum anatomical model, poking each depression of the plastic material corresponding to intestinal villi on the human jejunum anatomical model by the needle to form holes, finally, continuing to retain the needles on the plastic material, and solidifying and molding the plastic material to obtain the jejunum mould having the interior physiological structure of the true jejunum and retaining the needles; the bionic jejunum material is obtained by mixing a base material and auxiliary materials that are used for preparing the bionic jejunum in a certain mass ratio and then putting the mixture into a vacuum machine for vacuumizing and removing bubbles;

or the method comprises the steps: firstly preparing a jejunum mould having an interior physiological structure of a true jejunum and retaining needles, then smearing a bionic jejunum raw material on a surface of the jejunum mould contacting with a human jejunum anatomical model according to a certain thickness, standing so as to solidify and mold the bionic jejunum raw material, pulling out the needles but skipping removing the mould so as to obtain the bionic jejunum having intestinal villi and being hollow, then covering a surface of the bionic jejunum not contacting with the jejunum mould with one layer of partition, smearing the bionic jejunum raw material on a surface of the partition not contacting with the bionic jejunum according to a certain thickness, standing so as to solidify and mold the bionic jejunum raw material smeared on the surface of the partition, removing the partition, and removing the mould to obtain the bionic jejunum having jejunum physiological structure villi and capable of secreting intestinal juice, wherein preparation of the jejunum mould having the interior physiological structure of the true jejunum and retaining the needles comprises the steps: filling the precise human jejunum anatomical model of a medicine gastroenterology department with a plastic material, then taking out the human jejunum anatomical model, poking each depression of the plastic material corresponding to intestinal villi on the human jejunum anatomical model by the needle to form holes, finally, continuing to retain the needles on the plastic material, and solidifying and molding the plastic material to obtain the jejunum mould having the interior physiological structure of the true jejunum and retaining the needles; the bionic jejunum material is obtained by mixing the base material and the auxiliary materials that are used for preparing the bionic jejunum in a certain mass ratio and then putting the mixture into a vacuum machine for vacuumizing and removing bubbles;

the base material comprises one or more of silica gel, latex or hydrogel; and the auxiliary materials comprise silicone oil and/or a curing agent.

In one embodiment of the disclosure, the human intestinal tract anatomical model of the medicine gastroenterology department is a hollow model, wherein the ratio of the hollow model to a true intestinal tract is 1:1.

In one embodiment of the disclosure, the plastic material comprises argil, paraffin, glass or steel.

In one embodiment of the disclosure, the plastic material comprises argil, paraffin, glass or steel.

In one embodiment of the disclosure, the argil is soft clay.

In one embodiment of the disclosure, preparation of a jejunum mould having the interior physiological structure of the true jejunum and retaining needles comprises the steps: filling the precise human jejunum anatomical model of the medicine gastroenterology department with the soft clay, then taking out the human jejunum anatomical model, poking each depression of the soft clay corresponding to intestinal villi on the human jejunum anatomical model by the needle to form holes, finally continuing to retain the needles on the soft clay, baking the soft clay so as to solidify and mold, and naturally cooling the soft clay to prevent generation of cracks due to quick cooling of the mould, thereby obtaining the jejunum mould having the interior physiological structure of the true jejunum and retaining the needles.

In one embodiment of the disclosure, the baking time is 15 to 30 min.

In one embodiment of the disclosure, the diameter of the hole is 0.2 to 1 mm.

In one embodiment of the disclosure, when each depression of the soft clay corresponding to intestinal villi on the human jejunum anatomical model is poked by the needle to form holes, the needles should penetrate through the soft clay and one end of the needle exceeds the surface of the soft clay contacting with the human jejunum anatomical model by at least 2 mm.

In one embodiment of the disclosure, the jejunum mould is 2 to 3 cm in diameter and 20 to 30 cm in length.

In one embodiment of the disclosure, the mass ratio of the base material to the silicone oil to the curing agent is 100:(1.5 to 2.5):(1.5 to 2.5).

In one embodiment of the disclosure, the mass ratio of the base material to the auxiliary material is 100:2:2.

In one embodiment of the disclosure, the base material is silica gel.

In one embodiment of the disclosure, the silica gel is transparent silica gel or semi-transparent silica gel.

In one embodiment of the disclosure, the curing agent comprises one or more of tetraethoxysilane, vinyl triamine, DETA aminoethyl piperazine (AE), m-phenylenediamine (m-PDA, MPD), diaminodiphenyl-methane (DDM) and HT-972 DEH-50.

In one embodiment of the disclosure, the conditions of vacuumizing and removing bubbles are as follows: the negative pressure of the vacuum machine is −0.1 to 0.09 MPa, and time is 5 to 10 min.

In one embodiment of the disclosure, the conditions of vacuumizing and removing bubbles are as follows: the negative pressure of the vacuum machine is 0.09 MPa, and time is 7 min.

In one embodiment of the disclosure, the thickness of the bionic jejunum raw material smeared on the surface of the jejunum mould is 1.5 to 2.5 mm.

In one embodiment of the disclosure, the thickness of the bionic jejunum raw material smeared on the surface of the jejunum mould is 2 mm.

In one embodiment of the disclosure, the standing time is 2 to 4 h.

In one embodiment of the disclosure, the standing time is 3 h.

In one embodiment of the disclosure, the partition comprises oily paper or a preservative film.

In one embodiment of the disclosure, the thickness of the bionic jejunum raw material smeared on the surface of the partition is 1.5 to 2.5 mm.

In one embodiment of the disclosure, the thickness of the bionic jejunum raw material smeared on the surface of the partition is 2 mm.

The disclosure provides a bionic jejunum prepared by the above method.

The beneficial effects are as follows:

(1) The bionic digestive tract prepared by using the bionic material of the disclosure is excellent in performance, has strong consistency with the true digestive tract in terms of performance, structure and function, can simulate the true states of food, drugs, microorganisms and the like in the digestive system, and has great application prospects in the research process of food and drugs.

(2) The bionic digestive tract prepared by using the bionic material of the disclosure can be transparent or semi-translucent, and can realize real-time in-vitro observation of the digestion state of the internal digestive tract.

(3) The bionic digestive tract prepared by using the bionic material of the disclosure has the advantages of no viscosity, no water insolubility, no reaction with acid and alkali, high and low temperature resistance, etc., and can well reproduce the digestion and absorption environment in the digestive tract.

(4) The bionic stomach of the disclosure is excellent in simulation performance (shore A hardness is 68±5, expansion rate is 36±5%, and elasticity is 550±50%), and has the true physiological structure of the inner wall of the true human stomach, can realize the function of the stomach to grind food, and has a strong consistency with the true human stomach in terms of performance, structure and function; and the bionic stomach of the disclosure separates the bionic stomach antrum from the bionic stomach body to respectively apply a certain pressure to the separated stomach antrum and stomach body, thereby achieving the "back flow" function between the stomach antrum and the stomach body.

(5) The bionic large intestine of the disclosure is excellent in simulation performance (shore A hardness is 60±5, expansion rate is 31±5%, and elasticity is 460±50%), has the shape and physiological structure of the true human large intestine, and can simulate the true digestive environment in the large intestine. For example, the inner part of the bionic large intestine has circular corrugations which can increase the inner surface area of the intestine and thus allow microbial flora in the large intestine to better digest and absorb food.

(6) The bionic ileum, duodenum and jejunum of the disclosure are excellent in simulation performance (ileum: shore A hardness is 32±5, expansion rate is 28±5%, and elasticity is 220±50%; duodenum: shore A hardness is 40±5, expansion rate is 22±5%, and elasticity is 250±50%; and jejunum: shore A hardness is 36±5, expansion rate is 25±5%, and elasticity is 250±50%), have the shape and physiological structure of the true human intestine tract, can truly stimulate the digestive environments in the human intestine tract; the interiors of the bionic ileum, duodenum and jejunum of the disclosure have circular corrugations which can increase the internal surface area of the intestine, so as to allow microbial flora in the ileum to better digest and absorb food; the interiors of the bionic ileum, duodenum and jejunum of the disclosure have intestinal villi and the intestinal villi can be of a double-layer hollow structure, if the hollow part is filled with the intestinal juice, the intestinal villi can automatically secrete the intestinal juice in the peristalsis process, thereby greatly reproducing the function of digestion and absorption in the intestinal tract.

DETAILED DESCRIPTION

Figure 1:
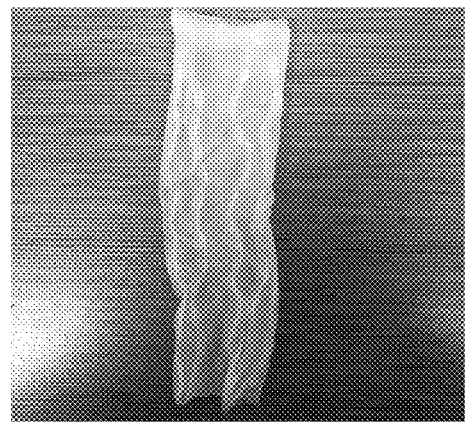
FIG. 1 is a picture of a stomach fundus of the disclosure.
Figure 2:
FIG. 2 is a picture of a stomach body of the disclosure.
Figure 3:
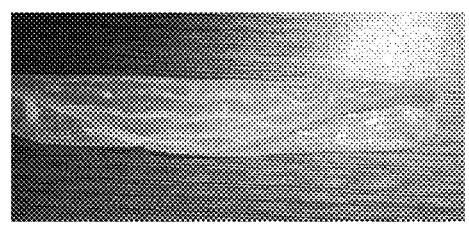
FIG. 3 is a picture of a stomach antrum of the disclosure.
Figure 4:
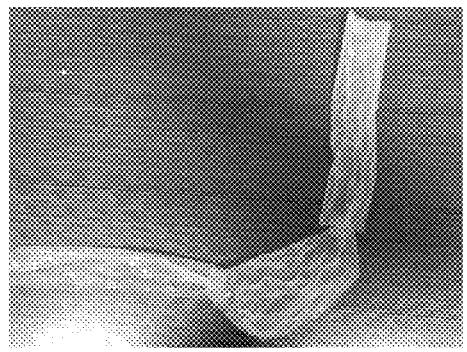
FIG. 4 is an overall picture of a stomach of the disclosure.
Figure 5:
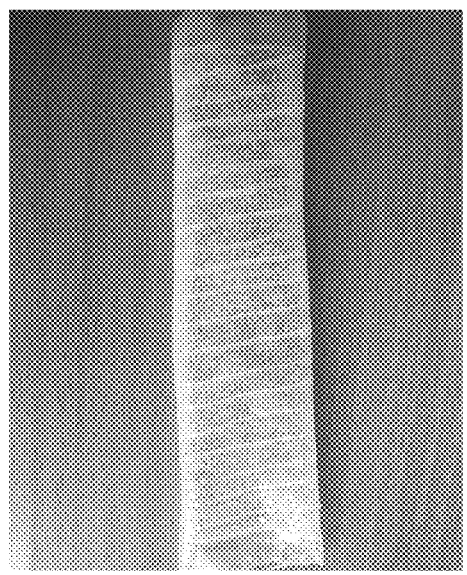
FIG. 5 is front pictures of a bionic ileum, duodenum and jejunum of the disclosure.
Figure 6:
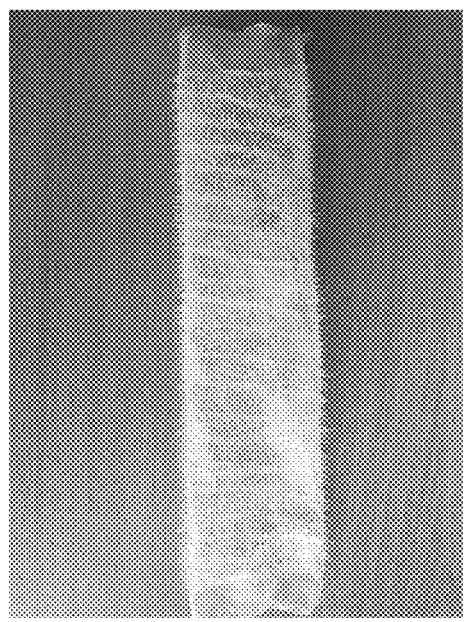
FIG. 6 is reverse pictures of a bionic ileum, duodenum and jejunum of the disclosure.
Figure 7:
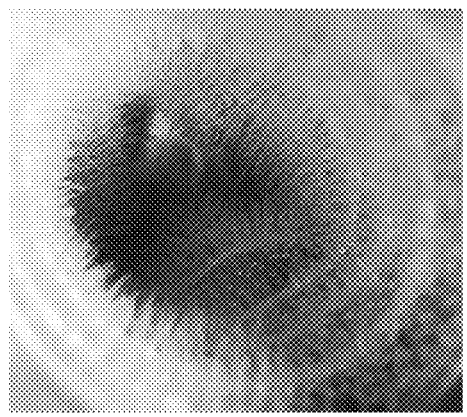
FIG. 7 is intestinal villi pictures of a bionic ileum, duodenum and jejunum of the disclosure.

Detection Methods Involved in the Following Examples are as Follows:
A Detection Method of an Area in Stomach is as Follows:

$$S=2\pi(r_1h_1+r_2h_2+r_3h_3)+n_1(\pi-1)r_1h_1+n_2(\pi-1)r_2h_2+n_3(\pi-1)r_3h_3,$$

wherein S is the area in a stomach, $r_1$ is the radius of a stomach fundus, $h_1$ is the height of the stomach fundus, $n_1$ is the quantity of stomach fundus walls, $r_2$ is the radius of a stomach body, $h_2$ is the height of the stomach body, $n_2$ is the quantity of stomach body walls, $r_3$ is the radius of a stomach antrum, $h_3$ is the height of the stomach antrum, and $n_3$ is the quantity of the stomach antrum.

A Detection Method of an Intestinal Area is as Follows:

$$S=2\pi r_1h_1+n(\pi-1)r_2h_2,$$

wherein S is the intestinal area, $r_1$ is the radius of an intestine, $h_1$ is the height of intestine, n is the quantity of intestine walls, $r_2$ is the radius of the intestine wall, and $h_2$ is the height of the intestine wall.

A Detection Method of a Food Grinding Function is as Follows:
The obtained bionic stomach fundus, bionic stomach body and bionic antrum/bionic stomach are wholly fixed in a stomach body visualization bionic reactor (the stomach body visualization bionic reactor is seen in the invention patent No. CN108088966A) through a flange interface of a pipeline. 100 g of raw rice, with the particle size of about 1 mm, is taken and added into the bionic stomach, the reactor runs for 10 min, and the rice is taken out to observe whether the particle size is smaller.

A Detection Method of a Back Flow Function is as Follows:
The bionic stomach is fixed in a stomach body visualization bionic reactor (the stomach body visualization bionic reactor is seen in the invention patent No.: CN108088966A), 100 ml of milk is added, the flow solenoid valve of the reactor is opened by running the reactor to give pressure to the bionic gastric antrum to see whether the "back flow function" of milk in the gastric antrum flowing back to the stomach body can be realized.

A Transparency Detection Method is as Follows:
Whether the silica gel is transparent and has bubbles is observed by visual inspection. The silica gel is stretched to see whether it is white. The white one is opaque. Rice, corn and other foods are put into the inside of the silica gel to see whether the appearance of the food can be clearly seen.

If the surface of food can be clearly seen, the transparency is good; if the outline of food can be seen, the transparency is moderate; if the image of food cannot be seen, the transparency is poor.

A Hardness (Shore Hardness) Detection Method is as Follows:
The hardness is measured using a Shore hardmeter. The needle of the hardmeter is pressed on the surface of the stomach to measure the depth of the needle pressed into the surface of the stomach.

An Expansion Rate Test Method is as Follows:

$$Pe=(W*m/A)\times 100\%,$$

wherein Pe is the expansion rate, W is the total balance load, A is the area of silica gel, and m is the lever ratio of the pressurized equipment.

An Elasticity Detection Method is as Follows:
The tensile test of silica gel is carried out on a tensile testing machine to measure the axial elongation and transverse elongation of silica gel until the silica gel is broken.

$$C=(D-d)\times 100\%/d,$$

wherein C is the elastic rate, D is the elongation, and d is the initial length of silica gel.

Detection of Intestinal Juice Secretion Function of Villi:
The obtained bionic duodenum is fixed in an intestinal visualized bionic reactor through the flange interface of the pipe (the intestinal visualized bionic reactor is seen in the invention patent NO.: CN108318625A), 100 ml of pancreatic juice is added into the bionic silica gel duodenum, the reactor is operated for 10 min, and the volume of pancreatic juice is observed.

Example 1.1: Preparation of Bionic Stomach (1) preparation of the clay: soft clay was kneaded repeatedly to obtain soft clay having good malleability;
(2) pressing of a stomach fundus mould: the kneaded soft clay was put into a stomach fundus of a precise human stomach anatomical model of a medicine gastroenterology department and strongly squeezed, and the human stomach anatomical model was taken out to obtain a soft clay stomach fundus mould having the interior physiological structure of a true stomach fundus;
(3) baking and molding of the stomach fundus mould: the stomach fundus mould was put into an oven and baked for 15 minutes so that the stomach fundus mould was solidified and molded and then naturally cooled, so as to obtain a bionic stomach fundus mould;
(4) pressing of a stomach body mould: the kneaded soft clay was put into a stomach body of the precise human stomach anatomical model of the medicine gastroenterology department and strongly squeezed, and the human stomach anatomical model was taken out to obtain a soft clay stomach body mould having the interior physiological structure of the true stomach body;
(5) baking and molding of the stomach body mould: the stomach body mould was put into the oven and baked for 15 minutes so that the stomach body mould was solidified and molded and then naturally cooled, so as to obtain the bionic stomach body mould;
(6) pressing of a stomach antrum mould: the kneaded soft clay was put into a stomach antrum of the precise human stomach anatomical model of the medicine gastroenterology department and strongly squeezed, and the human stomach anatomical model was taken out to obtain the soft clay stomach antrum mould having the interior physiological structure of the true stomach antrum;

(7) baking and molding of the stomach antrum mould: the stomach antrum mould was put into the oven and baked for 15 minutes so that the stomach antrum mould was solidified and molded and then naturally cooled, so as to obtain the bionic stomach antrum mould;

(8) preparation of silica gel: transparent silica gel, silicone oil and a curing agent tetrathoxysilane were placed in a beaker in a ratio of 100:8:2, sufficiently mixed and uniformly mixed;

(9) the uniformly mixed silica gel was put into a vacuum machine, vacuumized at a negative pressure of 0.09 MPa to remove the bubbles for 5 minutes to obtain a bubble-free silica gel;

(10) the bubble-free silica gel was uniformly smeared on the surface of the bionic stomach fundus, stomach body and stomach antrum moulds, with a thickness of about 1 mm;

(11) the three uniformly smeared moulds stood for 2 hours so that the moulds could be completely solidified and molded. After the moulds were removed, and after certain pruning, a bionic silica gel stomach fundus, a bionic silica gel stomach body and a bionic silica gel stomach antrum were obtained.

Example 1.2: Preparation of Bionic Stomach

On the basis of example 1.1, the mould baking time in steps (3), (5) and (7) was changed to 20 min, the curing agent in step (8) was changed to diaminodiphenyl-methane (DDM), and meanwhile the mass ratio of transparent silica gel to silicone oil to the curing agent was 100:7:1.5; the bubble removing time in step (9) was changed to 10 min; the smearing thickness in step (10) was changed to 2 mm; and the standing time in step (11) was changed to 4 h.

Example 1.3: Preparation of Bionic Stomach

On the basis of example 1.1, the mould baking time in steps (3), (5) and (7) was changed to 30 min, the curing agent in step (8) was changed to vinyl triamine, and meanwhile the mass ratio of transparent silica gel to silicone oil to the curing agent was changed to 100:9:3; the smearing thickness in step (10) was changed to 3 mm; and the standing time in step (11) was changed to 1 h.

Comparative Example 1.1: Preparation of Bionic Stomach (Without Interior Biological Structure of Stomach)

On the basis of example 1.1, step (2) is changed to: the kneaded soft clay was made into the shape of a stomach fundus having a smooth surface to obtain the stomach fundus mould; step (4) is changed to: the kneaded soft clay was made into the shape of a stomach body having a smooth surface to obtain the stomach body mould; step (6) is changed to: the kneaded soft clay was made into the shape of a stomach antrum having a smooth surface to obtain the stomach antrum mould; the mould baking time in steps (3), (5) and (7) was changed to 30 min; the mass ratio of transparent silica gel to silicone oil to the curing agent in step (8) was changed to 100:5:2; and the smearing thickness in step (10) was changed to 2 mm.

Comparative Example 1.2: Preparation of Bionic Stomach (Whole Stomach Model)

On the basis of example 1.1, steps (2) to (7) were changed to: the kneaded soft clay was made into the shape of a stomach having a smooth surface to obtain a stomach fundus mould, the stomach mould was put into the oven to be baked for 30 min so that the stomach mould was solidified and molded and then naturally cooled to obtain a stomach mould; the mass ratio of transparent silica gel to silicone oil to the curing agent in step (8) was changed to 100:6:1; and the smearing thickness in step (10) was 2 mm.

Comparative Example 1.3: Preparation of Bionic Stomach (After Mixing, the Silica Gel is not Vacuumized)

On the basis of example 1.1, the mould baking time in steps (3), (5) and (7) was changed to 30 min; the mass ratio of transparent silica gel to silicone oil to the curing agent in step (8) was changed to 100:10:3; step (9) was omitted; the smearing thickness in step (10) was changed to 3 mm; and the standing time in step (11) was changed to 1 h.

Comparative Example 1.4: Preparation of Bionic Stomach (The Thickness of Smeared Silica Gel is Increased)

On the basis of example 1.1, the mould baking time in steps (3), (5) and (7) was changed to 30 min; the mass ratio of transparent silica gel to silicone oil to the curing agent in step (8) was changed to 100:8:2; step (9) was omitted; the smearing thickness in step (10) was changed to 6 mm; the standing time in step (11) was changed to 1 h.

Comparative Example 1.5: Preparation of Bionic Stomach (Without Addition of Silicone Oil)

On the basis of example 1.1, the mould baking time in steps (3), (5) and (7) was changed to 30 min; the silicone oil in step (8) was omitted, meanwhile, the mass ratio of transparent silica gel to the curing agent was changed to 100:3; the smearing thickness in step (10) was changed to 2 mm; and the standing time in step (11) was changed to 1 h.

Comparative Example 1.6: Preparation of Bionic Stomach (With Addition of Glycerinum)

On the basis of example 1.1, the mould baking time in steps (3), (5) and (7) was changed to 30 min; the silicone oil in step (8) was replaced with glycerinum; the smearing thickness in step (10) was changed to 2 mm; and the standing time in step (11) was 1 h.

Example 1.4: Detection of Bionic Stomach

The anatomical model of a human stomach, the bionic stomachs prepared in examples 1.1 to 1.3, the bionic stomachs prepared in comparative examples 1.1 to 1.6 and the similar foreign products (Fast 10 model of bionic silica gel stomachs purchased from American Dragon Skin company) were subjected to detection of intragastric area, food grinding function, back flow function, transparency, hardness, expansion rate and elasticity. The detection results are shown in Table 1.

It can be seen from Table 1 that the indexes of the bionic stomachs and the true stomach of the disclosure are relatively close by comparison, and compared with the similar foreign products, the indexes are better. Therefore, the bionic stomachs of the disclosure can replace the true stomach to predict the live test, and can completely or partially replace the live test, so as to reduce the cost and time and improve the repeatability and accuracy, and there is no theoretical limitation.

(7) the uniformly smeared large intestine mould stood for 2 hours so that the mould was completely solidified and molded; and

TABLE 1

Performance Test Result

| | Intragastric area | Whether food is grinded | Whether a "back flow" function is present | Transparent effect | Hardness | Expansion rate | Elasticity |
|---|---|---|---|---|---|---|---|
| Human stomach anatomical model | 800 cm² | Yes | Yes | Opaque | 69 | 35% | 570% |
| Example 1.1 | 790 cm² | Yes | Yes | Good | 68 | 36% | 550% |
| Example 1.2 | 800 cm² | Yes | Yes | Good | 65 | 37% | 560% |
| Example 1.3 | 790 cm² | Yes | Yes | Moderate | 71 | 36% | 540% |
| Comparative example 1.1 | 400 cm² | No | Yes | Good | 63 | 32% | 520% |
| Comparative example 1.2 | 780 cm² | No | No | Good | 62 | 33% | 540% |
| Comparative example 1.3 | 780 cm² | Yes | Yes | Poor, and bubbles exist | 72 | 38% | 580% |
| Comparative example 1.4 | 790 cm² | Yes | Yes | Poor | 70 | 35% | 560% |
| Comparative example 1.5 | 800 cm² | Yes | Yes | Good | 73 | 10% | 530% |
| Comparative example 1.6 | 780 cm² | Yes | Yes | Good | 59 | 25% | 550% |
| Similar foreign products | 400 cm² | No | No | Good | 30 | 10% | 1000% |

Example 2.1: Preparation of Bionic Large Intestine (1) Preparation of clay: the soft clay was repeatedly kneaded to obtain soft clay having good malleability;

(2) pressing of a large intestine mould: the kneaded soft clay was put into a precise human large intestine anatomical model of a medicine gastroenterology department and strongly squeezed, the human large intestine anatomical model was taken out to obtain a soft clay large intestine mould having the interior physiological structure of a true large intestine, and the mould is 4 cm in diameter and 25 cm in length;

(3) baking and molding of the large intestine mould: the large intestine mould was put into an oven and baked for 15 minutes at 140° C. so that the large intestine mould was solidified and molded and then naturally cooled, so as to obtain the bionic large intestine mould;

(4) preparation of silica gel: transparent silica gel, silicone oil and a curing agent were placed in a beaker in a ratio of 100:5:2, sufficiently stirred and uniformly mixed;

(5) the uniformly mixed silica gel was put into a vacuum machine, and vacuumized at a negative pressure of 0.09 MPa to remove the bubbles for 5 minutes to obtain bubble-free silica gel;

(6) the bubble-free silica gel was uniformly smeared on the surface of the above bionic large intestine mould, with a thickness of about 1 mm;

(8) after the silica gel was removed from the large intestine mould, and after certain pruning, the bionic large intestine silica gel mould having intestine wall corrugations of the large intestine physiological structure was obtained.

Example 2.2: Preparation of Bionic Large Intestine

On the basis of example 2.1, the diameter of the mould in step (2) was changed to 4.5 cm; the curing agent in step (4) was replaced with vinyl triamine, and meanwhile the mass ratio of transparent silica gel to silicone oil to the curing agent was changed to 100:4:1; the smearing thickness in step (6) was changed to 2 mm; and the standing time in step (7) was changed to 4 h.

Example 2.3: Preparation of Bionic Large Intestine

On the basis of example 2.1, the diameter of the mould in step (2) was changed to 5 cm; the curing agent in step (4) was replaced with diaminodiphenyl-methane (DDM), and meanwhile the mass ratio of transparent silica gel to silicone oil to the curing agent was changed to 100:6:3; and the smearing thickness in step (6) was changed to 3 mm.

Comparative Example 2.1: Preparation of Bionic Large Intestine (Without Corrugations)

On the basis of example 2.1, step (2) is changed to: the kneaded soft clay was made into a long cylinder having a smooth surface, and the mould was 4 cm in diameter and 30 cm in length; the baking conditions in step (3) were changed to: baking was conducted for 30 min at 130°; the mass ratio of transparent silica gel to silicone oil to the curing agent in step (4) was changed to 100:5:3; the smearing thickness in step (6) was changed to 2 mm; and the standing time in step (7) was changed to 1 h.

Comparative Example 2.2: Preparation of Bionic Large Intestine (Silica Gel is not Vacuumized After Mixing)

On the basis of example 2.1, the diameter of the mould in step (2) was changed to 4.5 cm; the baking conditions in step (3) were changed to: baking was conducted for 30 min at 130° i; the mass ratio of transparent silica gel to silicone oil to the curing agent in step (4) was changed to 100:6:2; step (5) was omitted; and the smearing thickness in step (6) was changed to 2 mm.

Comparative Example 2.3: Preparation of Bionic Large Intestine (The Thickness of the Smeared Silica Gel is Increased)

On the basis of example 2.1, the diameter of the mould in step (2) was changed to 5 cm; the baking conditions in step (3) were changed to: baking was conducted for 30 min at 130° i; the curing agent in step (4) was replaced with vinyl triamine, and meanwhile the mass ratio of transparent silica gel to silicone oil to the curing agent was changed to 100:3:3; and the smearing thickness in step (6) was changed to 8 mm.

Comparative Example 2.4: Preparation of Bionic Large Intestine (Without Addition of Silicone Oil)

On the basis of example 2.1, the diameter of the mould in step (2) was changed to 5 cm; the baking conditions in step (3) were changed to: baking was conducted for 15 min at 150° i; the silicone oil in step (4) was omitted, and meanwhile the mass ratio of transparent silica gel to the curing agent was changed to 100:3; and the smearing thickness in step (6) was changed to 2 mm.

Comparative Example 2.5: Preparation of Bionic Large Intestine (With Addition of Glycerinum)

On the basis of example 2.1, the diameter of the mould in step (2) was changed to 5 cm; the baking conditions in step (3) were changed to: baking was conducted for 15 min at 150° i; the silicone oil in step (4) was replaced with glycerinum; and the smearing thickness in step (6) was changed to 2 mm.

Example 2.4: Detection of Bionic Large Intestine

The human large intestine anatomical model, the bionic large intestines prepared in examples 2.1 to 2.3, the bionic large intestines prepared in comparative examples 2.1 to 2.5 and the similar foreign products (Fast 6 model of bionic silica gel large intestines purchased from American Dragon Skin company), which are the same in length, were taken and subjected to detection of intestine area, transparency, hardness, expansion rate and elasticity. The detection results are shown in Table 2.

It can be seen from Table 2 that the indexes of the bionic large intestines of the disclosure and the true large intestine are relatively close by comparison, and compared with the similar foreign products, the indexes are better. Therefore, the bionic large intestines of the disclosure can replace the true large intestine to predict the live test, completely or partially replace the live test, so as to reduce the cost and time, improve the repeatability and accuracy, and there is no theoretical limitation.

TABLE 2

Performance Detection Results

| | Intestinal area | Transparent effect | Hardness | Expansion rate | Elasticity |
|---|---|---|---|---|---|
| Human large intestine anatomical model | >600 cm² | Opaque | 61 | 30% | 420% |
| Example 1 | >600 cm² | Good | 60 | 31% | 460% |
| Example 2 | >600 cm² | Good | 58 | 29% | 430% |
| Example 3 | >600 cm² | Good | 63 | 31% | 470% |
| Comparative example 1 | <200 cm² | Good | 64 | 30% | 490% |
| Comparative example 2 | >600 cm² | Poor, and bubbles exist | 59 | 33% | 430% |
| Comparative example 3 | >600 cm² | Poor | 63 | 28% | 420% |
| Comparative example 4 | >600 cm² | Good | 71 | 10% | 520% |
| Comparative example 5 | >600 cm² | Good | 58 | 20% | 550% |
| Similar foreign products | <200 cm² | Good | 30 | 10% | 1000% |

Example 3.1: Preparation of Bionic Ileum (1) Preparation of the clay: soft clay was repeatedly kneaded to obtain soft clay having good malleability;

(2) pressing of an ileum mould: the kneaded soft clay was put into a precise human ileum anatomical model of a medicine gastroenterology department and strongly squeezed, the human ileum anatomical model was taken out to obtain the soft clay ileum mould having the interior physiological structure of a true ileum, and the mould is 1.5 cm in diameter and 25 cm in length;

(3) manufacturing of hollow villi: a plurality of needles having a diameter of 0.5 mm were taken and pricked on each imprint of the above mould to poke small holes having a diameter of 1 mm and a depth of 5 mm, and the needles continued to be kept inside the mould;

(4) baking and molding of the ileum mould: the ileum mould was put into an oven and baked for 15 minutes at 140° w so that the ileum mould was solidified and molded and then naturally cooled, so as to obtain the bionic ileum mould;

(5) preparation of silica gel: transparent silica gel, silicone oil and a curing agent were placed in a beaker in a ratio of 100:3:1, sufficiently stirred and uniformly mixed;

(6) the uniformly mixed silica gel was put into a vacuum machine, vacuumized at a negative pressure of 0.09 MPa to remove the bubbles for 5 minutes to obtain bubble-free silica gel;

(7) the bubble-free silica gel was uniformly smeared on the surface of the above bionic ileum mould, with a thickness of about 2 mm;

(8) the uniformly smeared ileum mould stood for 2 hours so that the mould could be completely solidified and molded, and the needles outside the mould were pulled out to obtain an ileum silica gel model having intestinal villi and being hollow;

(9) the surface of the ileum mould in which needles were only pulled out and silica gel does not fall off is covered with oily paper, a hollow cylinder having a diameter of 2 cm and height of 4 cm was placed outside the mould and well adhered and fixed;

(10) bubble-free silica gel was uniformly smeared in a gap between the oily paper of the ileum mould and the cylinder, and standing was carried out for 2 h until the silica gel was completely solidified and molded;

(11) the solidified silica gel mould was placed in water for 10 min, and the oily paper was taken out from the hollow cylinder after water softened the oily paper; and

(12) after the silica gel was removed from the ileum mould, and after certain pruning, the bionic ileum silica gel model having intestine wall corrugations of the ileum physiological structure and villi capable of secreting intestinal juice was obtained.

Example 3.2: Preparation of Bionic Ileum

On the basis of example 3.1, the diameter of the mould in step (2) was changed to 2 cm; the diameter of the needle in step (3) was changed to 0.3 mm, and the diameter of the small hole was changed to 0.5 mm; the baking conditions in step (4) were changed to: baking was carried out for 20 min at 150° C.; the curing agent in step (5) was vinyl triamine, and meanwhile the mass ratio of transparent silica gel to silicone oil to the curing agent was changed to 100:3:1.5; the smearing thickness in step (7) was changed to 2.5 mm; the standing time in step (8) was changed to 4 h; the standing time in step (10) was changed to 1 h.

Example 3.3: Preparation of Bionic Ileum

On the basis of example 3.1, the diameter of the mould in step (2) was changed to 2.5 cm, and the length was changed to 30 cm; the diameter of the needle in step (3) was changed to 0.1 mm, and the diameter of the small hole was changed to 0.2 mm; the baking conditions in step (4) were changed to: baking was carried out for 30 min at 130° C.; the curing agent in step (5) was changed to diaminodiphenyl-methane (DDM), and meanwhile the mass ratio of transparent silica gel to silicone oil to the curing agent was 100:2.5:1; the smearing thickness in step (7) was changed to 3 mm; the standing time in step (8) was changed to 1 h; and the standing time in step (10) was changed to 1 h.

Comparative Example 3.1: Preparation of Bionic Ileum (Without Villi)

On the basis of example 3.1, the diameter of the mould in step (2) was changed to 2.5 cm, and the length was changed to 30 cm; step (3) was omitted; the baking conditions in step (4) were changed to: baking was conducted for 30 min at 130° C.; the mass ratio of transparent silica gel to silicone oil to the curing agent in step (5) was changed to 100:3.5:0.5; the smearing thickness in step (7) was changed to 2.5 mm; step (8) was changed to: the uniformly smeared ileum mould stood for 1 h so as to be completely solidified and molded; and steps (9) to (11) were omitted.

Comparative Example 3.2: Preparation of Bionic Ileum (Silica Gel is not Vacuumized After Mixing)

On the basis of example 3.1, the diameter of the mould in step (2) was changed to 2 cm, and the length was changed to 30 cm; the diameter of the needle in step (3) was changed to 0.2 mm, and the diameter of the small hole was changed to 0.5 mm; the baking conditions in step (4) were changed to: baking was conducted for 20 min at 140° C.; the mass ratio of transparent silica gel to silicone oil to the curing agent in step (5) was changed to 100:3:0.5; step (6) was omitted; and the smearing thickness in step (7) was changed to 2.5 mm.

Comparative Example 3.3: Preparation of Bionic Ileum (The Thickness of the Smeared Silica Gel is Increased)

On the basis of example 3.1, the diameter of the mould in step (2) was changed to 2 cm, and the length was changed to 30 cm; the diameter of the needle in step (3) was changed to 0.4 mm, and the diameter of the small hole was changed to 0.6 mm; the baking conditions in step (4) were changed to: baking was conducted for 30 min at 130° C.; the mass ratio of transparent silica gel to silicone oil to the curing agent in step (5) was changed to 100:2.5:1.5; and the smearing thickness in step (7) was changed to 6 mm.

Comparative Example 3.4: Preparation of Bionic Ileum (Without Addition of Silicone Oil)

On the basis of example 3.1, the diameter of the mould in step (2) was changed to 2 cm, and the length was changed to 30 cm; the diameter of the needle in step (3) was changed to 0.4 mm, and the diameter of the small hole was changed to 0.6 mm; the baking conditions in step (4) were changed to: baking was conducted for 30 min at 130° C.; and silicone oil in step (5) was omitted.

Comparative Example 3.5: Preparation of Bionic Ileum (With Addition of Glycerinum)

On the basis of example 3.1, the diameter of the mould in step (2) was changed to 2 cm, and the length was changed to 30 cm; the diameter of the needle in step (3) was changed to 0.4 mm, and the diameter of the small hole was changed to 0.6 mm; the baking conditions in step (4) were changed to: baking was conducted for 30 min at 130° C.; and silicone oil in step (5) was replaced with glycerinum.

Example 3.4: Detection of Bionic Ileum

The human ileum anatomical model, the bionic ilea prepared in examples 3.1 to 3.3, the bionic ilea prepared in comparative examples 3.1 to 3.5 and the similar foreign products (Fast 3 model of bionic silica gel ilea purchased from American Dragon Skin company), which are the same in length, were taken and subjected to detection of intestine area, transparency, hardness, expansion rate and elasticity. The detection results are shown in Table 3.

It can be seen from Table 3 that the indexes of the bionic ilea of the disclosure and the true ileum are relatively close by comparison, and compared with the similar foreign products, the indexes are better. Therefore, the bionic ilea of the disclosure can replace the true ileum to predict the live test, and can completely or partially replace the live test, so as to reduce the cost and time and improve the repeatability and accuracy, and there is no theoretical limitation.

TABLE 3

Performance Detection Results

|  | Intestinal area | Transparent effect | Hardness | Expansion rate | Elasticity | Whether villi have a function of secreting intestinal juice |
|---|---|---|---|---|---|---|
| Human ileum anatomical model | >3500 cm² | Opaque | 32 | 28% | 220% | Yes |
| Example 1 | >3500 cm² | Good | 32 | 29% | 240% | Yes |
| Example 2 | >3500 cm² | Good | 33 | 28% | 220% | Yes |
| Example 3 | >3500 cm² | Good | 32 | 27% | 210% | Yes |
| Comparative example 1 | 300 cm² | Good | 30 | 29% | 230% | No |
| Comparative example 2 | >3500 cm² | Poor, and bubbles exist | 31 | 28% | 220% | Yes |
| Comparative example 3 | >3500 cm² | Poor | 35 | 27% | 210% | Yes |
| Comparative example 4 | >3500 cm² | Good | 56 | 12% | 550% | Yes |
| Comparative example 5 | >3500 cm² | Good | 51 | 18% | 500% | Yes |
| Similar foreign products | 300 cm² | Good | 30 | 10% | 1000% | No |

Example 4.1: Preparation of Bionic Duodenum (1) Preparation of clay: soft clay was repeatedly kneaded to obtain soft clay having good malleability;

(2) pressing of a duodenum mould: the kneaded soft clay was put into a precise human duodenum anatomical model of a medicine gastroenterology department and strongly squeezed, the human duodenum anatomical model was taken out to obtain the soft clay duodenum mould having the interior physiological structure of a true duodenum, and the mould is 3 cm in diameter and 25 cm in length;

(3) manufacturing of hollow villi: a plurality of needles having a diameter of 0.5 mm were taken and pricked each imprint of the above mould to poke so as to form small holes having a diameter of 1 mm and a depth of 5 mm, and the needles continued to be kept inside the mould;

(4) baking and molding of the duodenum mould: the duodenum mould was put into an oven and baked for 15 minutes at 140° C. so that the duodenum mould was solidified and molded and then naturally cooled, so as to obtain the bionic duodenum mould;

(5) preparation of silica gel: transparent silica gel, silicone oil and a curing agent tetraethoxysilane were placed in a beaker in a ratio of 100:1:3, sufficiently stirred and uniformly mixed;

(6) the uniformly mixed silica gel was put into a vacuum machine, and vacuumized at a negative pressure of 0.09 MPa to remove the bubbles for 5 minutes to obtain bubble-free silica gel;

(7) the bubble-free silica gel was uniformly smeared on the surface of the above bionic duodenum mould, with a thickness of about 1 mm;

(8) the uniformly smeared duodenum mould stood for 2 hours so that the mould could be completely solidified and molded, and the needles outside the mould were pulled out to obtain a duodenum silica gel model having intestinal villi and being hollow;

(9) the surface of the ileum mould in which needles were only pulled out and silica gel did not fall off is covered with oily paper, and a hollow cylinder having a diameter of 2 cm and height of 4 cm was placed outside the mould and well adhered and fixed;

(10) bubble-free silica gel was uniformly smeared in a gap between the oily paper of the duodenum mould and the cylinder, and standing was carried out for 2 h until the silica gel was completely solidified and molded;

(11) the solidified silica gel mould was placed in water for 10 min, and the oily paper was taken out from the hollow cylinder after water softened the oily paper; and

(12) after the silica gel was removed from the duodenum mould, and after certain pruning, the bionic duodenum silica gel model having intestine wall corrugations of the duodenum physiological structure and villi capable of secreting intestinal juice was obtained.

Example 4.2: Preparation of Bionic Duodenum

On the basis of example 4.1, the diameter of the mould in step (2) was changed to 3.5 cm; the diameter of the needle in step (3) was changed to 0.3 mm, and the diameter of the small hole was changed to 0.5 mm; the baking conditions in step (4) were changed to: baking was carried out for 20 min at 150° C.; the curing agent in step (5) was changed to vinyl triamine, and meanwhile the mass ratio of transparent silica gel to silicone oil to the curing agent was changed to 100:1.5:3; the smearing thickness in step (7) was changed to 1.5 mm; the standing time in step (8) was changed to 4 h; and the standing time in step (10) was changed to 1 h.

Example 4.3: Preparation of Bionic Duodenum

On the basis of example 4.1, the diameter of the mould in step (2) was changed to 4 cm, and the length was changed to 30 cm; the diameter of the needle in step (3) was changed to 0.1 mm, and the diameter of the small hole was changed to 0.2 mm; the baking conditions in step (4) were changed to: baking was carried out for 30 min at 130° C.; the curing agent in step (5) was changed to diaminodiphenyl-methane (DDM), and meanwhile the mass ratio of transparent silica gel to silicone oil to the curing agent was changed to 100:1:2.5; the smearing thickness in step (7) was changed to 2 mm; the standing time in step (8) was changed to 1 h; and the standing time in step (10) was changed to 1 h.

Comparative Example 4.1: Preparation of Bionic Duodenum (Without Villi)

On the basis of example 4.1, the length of the mould in step (2) was changed to 30 cm; step (3) was omitted; the baking conditions in step (4) were changed to: baking was conducted for 30 min at 130° C.; the mass ratio of transparent silica gel to silicone oil to the curing agent in step (5) was changed to 100:1:3; the smearing thickness in step (7) was changed to 1.5 mm; step (8) was changed to: the uniformly smeared duodenum mould stood for 1 h so that it was completely solidified and molded; and steps (9) to (11) were omitted.

Comparative Example 4.2: Preparation of Bionic Duodenum (Silica Gel is not Vacuumized After Mixing)

On the basis of example 4.1, the diameter of the mould in step (2) was changed to 3.5 cm, and length was changed to 30 cm; the diameter of the needle in step (3) was changed to 0.2 mm, and the diameter of the small hole was changed to 0.5 mm; the baking conditions in step (4) were changed to: baking was conducted for 20 min at 140° C.; the mass ratio of transparent silica gel to silicone oil to the curing agent in step (5) was changed to 100:0.5:2.5; step (6) was omitted; and the smearing thickness in step (7) was changed to 1.5 mm.

Comparative Example 4.3: Preparation of Bionic Duodenum (The Thickness of the Smeared Silica Gel is Increased)

On the basis of example 4.1, the diameter of the mould in step (2) was changed to 4 cm, and the length was changed to 30 cm; the diameter of the needle in step (3) was changed to 0.4 mm, and the diameter of the small hole was changed to 0.6 mm; the baking conditions in step (4) were changed to: baking was conducted for 30 min at 130° C.; the mass ratio of transparent silica gel to silicone oil to the curing agent in step (5) was changed to 100:1.5:3.5; and the smearing thickness in step (7) was changed to 6 mm.

Comparative Example 4.4: Preparation of Bionic Duodenum (Without Addition of Silicone Oil)

On the basis of example 4.1, the diameter of the mould in step (2) was changed to 4 cm, and the length was changed to 30 cm; the diameter of the needle in step (3) was changed to 0.4 mm, and the diameter of the small hole was changed to 0.6 mm; the baking conditions in step (4) were changed to: baking was conducted for 30 min at 130° C.; and silicone oil in step (5) was omitted.

Comparative Example 4.5: Preparation of Bionic Duodenum (With Addition of Glycerinum)

On the basis of example 4.1, the diameter of the mould in step (2) was changed to 4 cm, and the length was changed to 30 cm; the diameter of the needle in step (3) was changed to 0.4 mm, and the diameter of the small hole was changed to 0.6 mm; the baking conditions in step (4) were changed to: baking was conducted for 30 min at 130° C.; and silicone oil in step (5) was replaced with glycerinum.

Example 4.4: Detection of Bionic Duodenum

The human duodenum anatomical model, the bionic duodenums prepared in examples 4.1 to 4.3, the bionic duodenums prepared in comparative examples 4.1 to 4.5 and the similar foreign products (Fast 8 model of bionic silica gel duodenums purchased from American Dragon Skin company), which are the same in length, were taken and subjected to detection of intestine area, transparency, hardness, expansion rate and elasticity. The detection results are shown in Table 4.

It can be seen from Table 4 that the indexes of the bionic duodenums of the disclosure and the true duodenum are relatively close by comparison, and compared with the similar foreign products, the indexes are better. Therefore, the bionic duodenums of the disclosure can replace the true duodenum to predict the live test, and can completely or partially replace the live test, so as to reduce the cost and time, improve the repeatability and accuracy, and there is no theoretical limitation.

TABLE 4

Performance Detection Results

| | Intestinal area | Transparent effect | Hardness | Expansion rate | Elasticity | Whether villi have a function of secreting intestinal juice |
|---|---|---|---|---|---|---|
| Human duodenum anatomical model | >3000 cm$^2$ | Opaque | 40 | 22% | 250% | Yes |
| Example 1 | >3000 cm$^2$ | Good | 42 | 22% | 240% | Yes |
| Example 2 | >3000 cm$^2$ | Good | 40 | 25% | 280% | Yes |
| Example 3 | >3000 cm$^2$ | Good | 39 | 23% | 250% | Yes |
| Comparative example 1 | 300 cm$^2$ | Good | 41 | 22% | 230% | No |
| Comparative example 2 | >3000 cm$^2$ | Poor, and bubbles exist | 39 | 19% | 210% | Yes |
| Comparative example 3 | >3000 cm$^2$ | Poor | 44 | 23% | 260% | Yes |
| Comparative example 4 | >3000 cm$^2$ | Good | 69 | 10% | 530% | Yes |
| Comparative example 5 | >3000 cm$^2$ | Good | 70 | 12% | 450% | Yes |
| Similar foreign products | 300 cm$^2$ | Good | 30 | 20% | 1000% | No |

Example 5.1: Preparation of Bionic Jejunum (1) Preparation of clay: soft clay was repeatedly kneaded to obtain soft clay having good malleability;

(2) pressing of a jejunum mould: the kneaded soft clay was put into a precise human jejunum anatomical model of a medicine gastroenterology department and strongly squeezed, the human jejunum anatomical model was taken out to obtain the soft clay jejunum mould having the interior physiological structure of a true jejunum, and the mould is 2 cm in diameter and 25 cm in length;

(3) manufacturing of hollow villi: a plurality of needles having a diameter of 0.5 mm were taken and pricked each imprint of the above mould to poke so as to form small holes having a diameter of 1 mm and a depth of 5 mm, and the needles continued to be kept inside the mould;

(4) baking and molding of the jejunum mould: the duodenum mould was put into an oven and baked for 15 minutes at 140° C. so that the duodenum mould was solidified and molded and then naturally cooled, so as to obtain the bionic jejunum mould;

(5) preparation of silica gel: transparent silica gel, silicone oil and a curing agent tetraethoxysilane were placed in a beaker in a ratio of 100:2:2, sufficiently stirred and uniformly mixed;

(6) the uniformly mixed silica gel was put into a vacuum machine, and vacuumized at a negative pressure of 0.09 MPa to remove the bubbles for 5 minutes to obtain bubble-free silica gel;

(7) the bubble-free silica gel was uniformly smeared on the surface of the above bionic duodenum mould, with a thickness of about 1.5 mm;

(8) the uniformly smeared jejunum mould stood for 2 hours so that the mould could be completely solidified and molded, and the needles outside the mould were pulled out to obtain a jejunum silica gel model having intestinal villi and being hollow;

(9) the surface of the jejunum mould in which needles were only pulled out and silica gel does not fall off is covered with oily paper, and a hollow cylinder having a diameter of 2 cm and height of 4 cm was placed outside the mould and well adhered and fixed;

(10) bubble-free silica gel was uniformly smeared in a gap between the oily paper of the jejunum mould and the cylinder, and standing was carried out for 2 h until the silica gel was completely solidified and molded;

(11) the solidified silica gel mould was placed in water for 10 min, and the oily paper was taken out from the hollow cylinder after water softened the oily paper; and

(12) after the silica gel was removed from the jejunum mould, and after certain pruning, the bionic jejunum silica gel model having intestine wall corrugations of the jejunum physiological structure and villi capable of secreting intestinal juice was obtained.

Example 5.2: Preparation of Bionic Jejunum

On the basis of example 5.1, the diameter of the mould in step (2) was changed to 2.5 cm; the diameter of the needle in step (3) was changed to 0.3 mm, and the diameter of the small hole was changed to 0.5 mm; the baking conditions in step (4) were changed to: baking was carried out for 20 min at 150° C.; the curing agent in step (5) was vinyl triamine, and meanwhile the mass ratio of transparent silica gel to silicone oil to the curing agent was changed to 100:1.5:2; the smearing thickness in step (7) was changed to 2 mm; the standing time in step (8) was changed to 4 h; and the standing time in step (10) was changed to 1 h.

Example 5.3: Preparation of Bionic Jejunum

On the basis of example 5.1, the diameter of the mould in step (2) was changed to 3 cm, and the length was changed to 30 cm; the diameter of the needle in step (3) was changed to 0.1 mm, and the diameter of the small hole was changed to 0.2 mm; the baking conditions in step (4) were changed to: baking was carried out for 30 min at 130° C.; the curing agent in step (5) was changed to diaminodiphenyl-methane (DDM), and meanwhile the mass ratio of transparent silica gel to silicone oil to the curing agent was changed to 100:2:2.5; the smearing thickness in step (7) was changed to 2.5 mm; the standing time in step (8) was changed to 1 h; and the standing time in step (10) was changed to 1 h.

Comparative Example 5.1: Preparation of Bionic Duodenum (Without Villi)

On the basis of example 5.1, the diameter of the mould in step (2) was changed to 2.5 cm, and the length was changed to 30 cm; step (3) was omitted; the baking conditions in step (4) were changed to: baking was conducted for 30 min at 130° C.; the mass ratio of transparent silica gel to silicone oil to the curing agent in step (5) was changed to 100:1.5:2.5; the smearing thickness in step (7) was changed to 2 mm; step (8) was changed to: the uniformly smeared jejunum mould stood for 1 h so that it was completely solidified and molded; and steps (9) to (11) were omitted.

Comparative Example 5.2: Preparation of Bionic Jejunum (Silica Gel is not Vacuumized After Mixing)

On the basis of example 5.1, the diameter of the mould in step (2) was changed to 2.5 cm, and the length was changed to 30 cm; the diameter of the needle in step (3) was changed to 0.2 mm, and the diameter of the small hole was changed to 0.5 mm; the baking conditions in step (4) were changed to: baking was conducted for 20 min at 140° C.; the mass ratio of transparent silica gel to silicone oil to the curing agent in step (5) was changed to 100:2.5:1.5; step (6) was omitted; and the smearing thickness in step (7) was changed to 2 mm.

Comparative Example 5.3: Preparation of Bionic Jejunum (The Thickness of the Smeared Silica Gel is Increased)

On the basis of example 5.1, the diameter of the mould in step (2) was changed to 2.5 cm, and the length was changed to 30 cm; the diameter of the needle in step (3) was changed to 0.4 mm, and the diameter of the small hole was changed to 0.6 mm; the baking conditions in step (4) were changed to: baking was conducted for 30 min at 130° C.; the mass ratio of transparent silica gel to silicone oil to the curing agent in step (5) was changed to 100:2:2; and the smearing thickness in step (7) was changed to 6 mm.

Comparative Example 5.4: Preparation of Bionic Jejunum (Without Addition of Silicone Oil)

On the basis of example 5.1, the diameter of the mould in step (2) was changed to 2.5 cm, and the length was changed to 30 cm; the diameter of the needle in step (3) was changed to 0.4 mm, and the diameter of the small hole was changed to 0.6 mm; the baking conditions in step (4) were changed to: baking was conducted for 30 min at 130° C.; and silicone oil in step (5) was omitted.

Comparative Example 5.5: Preparation of Bionic Jejunum (With Addition of Glycerinum)

On the basis of example 5.1, the diameter of the mould in step (2) was changed to 2.5 cm, and the length was changed to 30 cm; the diameter of the needle in step (3) was changed to 0.4 mm, and the diameter of the small hole was changed to 0.6 mm; the baking conditions in step (4) were changed to: baking was conducted for 30 min at 130° C.; and silicone oil in step (5) was replaced with glycerinum.

Example 5.4: Detection of Bionic Jejunum

The human jejunum anatomical model, the bionic jejuna prepared in examples 5.1 to 5.3, the bionic jejuna prepared in comparative examples 5.1 to 5.5 and the similar foreign products (Fast 4 model of bionic silica gel jejuna purchased from American Dragon Skin company), which are the same in length, were taken and subjected to detection of intestine area, transparency, hardness, expansion rate and elasticity. The detection results are shown in Table 5.

It can be seen from Table 5 that the indexes of the bionic jejuna of the disclosure and the true jejunum are relatively close by comparison, and compared with the similar foreign products, the indexes are better. Therefore, the bionic jejuna of the disclosure can replace the true jejunum to predict the live test, and can completely or partially replace the live test, so as to reduce the cost and time, improve the repeatability and accuracy, and there is no theoretical limitation.

TABLE 5

Performance Detection Results

| | Intestinal area | Transparent effect | Hardness | Expansion rate | Elasticity | Whether villi have a function of secreting intestinal juice |
|---|---|---|---|---|---|---|
| Human jejunum anatomical model | >4000 cm² | Opaque | 36 | 25% | 240% | Yes |
| Example 1 | >4000 cm² | Good | 36 | 26% | 260% | Yes |
| Example 2 | >4000 cm² | Good | 35 | 24% | 230% | Yes |
| Example 3 | >4000 cm² | Good | 38 | 25% | 220% | Yes |
| Comparative example 1 | 300 cm² | Good | 39 | 24% | 210% | No |
| Comparative example 2 | >4000 cm² | Poor, and bubbles exist | 33 | 26% | 240% | Yes |
| Comparative example 3 | >4000 cm² | Poor | 36 | 25% | 250% | Yes |
| Comparative example 4 | >4000 cm² | Good | 60 | 12% | 540% | Yes |
| Comparative example 5 | >4000 cm² | Good | 70 | 15% | 490% | Yes |
| Similar foreign products | 300 cm² | Good | 30 | 10% | 1000% | No |

Although the disclosure has been disclosed by preferred examples as above, but the preferred examples are not intended to limit the disclosure, those skilled in the art can make various variations and modifications without departing from the spirit and scope of the disclosure, and therefore the protective scope of the disclosure should be based on claims.

What is claimed is:

1. A preparation method of a bionic duodenum, comprising steps of: firstly preparing a duodenum mould having an interior physiological structure of a true duodenum and retaining needles, then smearing a bionic duodenum raw material on a surface of the duodenum mould contacting with a human duodenum anatomical model according to a certain thickness, standing so as to solidify and mold the bionic duodenum raw material, pulling out the needles, and removing the mould so as to obtain the bionic duodenum having intestinal villi and being hollow, wherein the preparing the duodenum mould having the interior physiological structure of the true duodenum and retaining the needles comprises steps of: filling a precise human duodenum anatomical model of a medicine gastroenterology department with a plastic material, then taking out the human duodenum anatomical model, poking each depression of the plastic material corresponding to intestinal villi on the human duodenum anatomical model by the needles to form holes, finally, continuing to retain the needles on the plastic material, and solidifying and molding the plastic material to obtain the duodenum mould having the interior physiological structure of the true duodenum and retaining the needles; and the bionic duodenum raw material is obtained by mixing a base material and auxiliary materials that are used for preparing the bionic duodenum in a certain mass ratio and then putting the mixture into a vacuum machine for vacuumizing and removing bubbles; or comprising steps of: firstly preparing a duodenum mould having an interior physiological structure of a true duodenum and retaining needles, then smearing a bionic duodenum raw material on a surface of the duodenum mould contacting with a human duodenum anatomical model according to a certain thickness, standing so as to solidify and mold the bionic duodenum raw material, pulling out the needles but skipping removing the mould so as to obtain the bionic duodenum having intestinal villi and being hollow, then covering a surface of the bionic duodenum not contacting with the duodenum mould with one layer of partition, smearing the bionic duodenum raw material on a surface of the partition not contacting with the bionic duodenum according to a certain thickness, standing so as to solidify and mold the bionic duodenum raw material smeared on the surface of the partition, removing the partition, and removing the mould to obtain the bionic duodenum having duodenum physiological structure villi and capable of secreting intestinal juice, wherein the preparing the duodenum mould having the interior physiological structure of the true duodenum and retaining the needles comprises steps of: filling a precise human duodenum anatomical model of a medicine gastroenterology department with a plastic material, then taking out the human duodenum anatomical model, poking each depression of the plastic material corresponding to intestinal villi on the human duodenum anatomical model by the needles to form holes, finally, continuing to retain the needles on the plastic material, and solidifying and molding the plastic material to obtain the duodenum mould having the interior physiological structure of the true duodenum and retaining the needles; and the bionic duodenum raw material is obtained by mixing the base material and the auxiliary materials that are used for preparing the bionic duodenum in a certain mass ratio and then putting the mixture into a vacuum machine for vacuumizing and removing bubbles, wherein the base material comprises one or more selected from a group consisting of silica gel, latex and hydrogel; and the auxiliary materials comprise silicone oil and/or a curing agent.

* * * * *